(12) United States Patent
Mihira et al.

(10) Patent No.: US 11,987,179 B2
(45) Date of Patent: *May 21, 2024

(54) VEHICLE INTERIOR MEMBER

(71) Applicant: TS TECH CO., LTD., Asaka (JP)

(72) Inventors: Manabu Mihira, Tochigi (JP); Yuji Nakano, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/303,816

(22) Filed: Apr. 20, 2023

(65) Prior Publication Data

US 2023/0339391 A1    Oct. 26, 2023

Related U.S. Application Data

(63) Continuation of application No. 17/399,256, filed on Aug. 11, 2021, now Pat. No. 11,654,826, which is a
(Continued)

(30) Foreign Application Priority Data

Oct. 2, 2017 (JP) .................................. 2017-192976

(51) Int. Cl.
*B60Q 3/51* (2017.01)
*B60Q 3/217* (2017.01)
(Continued)

(52) U.S. Cl.
CPC ............... *B60Q 3/51* (2017.02); *B60Q 3/217* (2017.02); *B60Q 3/225* (2017.02); *B60Q 3/54* (2017.02);
(Continued)

(58) Field of Classification Search
CPC . B60Q 3/64; B60Q 3/217; B60Q 3/54; B60Q 3/78; B60Q 2500/10; B60Q 3/51;
(Continued)

(56) References Cited

U.S. PATENT DOCUMENTS 9,121,565 B2    9/2015    Marcori
9,376,057 B2    6/2016    Willerton
(Continued)

FOREIGN PATENT DOCUMENTS

DE    102014019607    6/2016
JP    2008162296    7/2008
(Continued)

OTHER PUBLICATIONS

Chinese Office Action for corresponding CN Application No. 201880062370.4, dated Jan. 28, 2023, 7 pages.
(Continued)

*Primary Examiner* — Elmito Breval
(74) *Attorney, Agent, or Firm* — Dority & Manning, PA

(57) ABSTRACT

In an interior member for a vehicle, a lens extends along a light guide member, and is provided with a groove receiving the light guide member therein, a first engaging portion provided on a wall that defines the groove, and a second engaging portion provided on a wall that defines the groove, and the interior member main body is provided with a first engaged portion engaged by the first engaging portion, and a second engaged portion engaged by the second engaging portion, the lens being resiliently deformable so as to bring the walls defining the groove toward each other.

9 Claims, 10 Drawing Sheets

Related U.S. Application Data continuation of application No. 16/652,184, filed as application No. PCT/JP2018/036360 on Sep. 28, 2018, now Pat. No. 11,110,858.

(51) Int. Cl.

| | | |
|---|---|---|
| *B60Q 3/225* | (2017.01) | |
| *B60Q 3/54* | (2017.01) | |
| *B60Q 3/64* | (2017.01) | |
| *B60Q 3/78* | (2017.01) | |
| *F21V 5/04* | (2006.01) | |
| *F21V 8/00* | (2006.01) | |
| *F21V 17/08* | (2006.01) | |
| *B60R 7/04* | (2006.01) | |
| *B60R 13/02* | (2006.01) | |
| *F21W 106/00* | (2018.01) | |

(52) U.S. Cl.
CPC .............. *B60Q 3/64* (2017.02); *B60Q 3/78* (2017.02); *F21V 5/04* (2013.01); *F21V 17/08* (2013.01); *G02B 6/001* (2013.01); *B60R 7/046* (2013.01); *B60R 13/0243* (2013.01); *F21W 2106/00* (2018.01)

(58) Field of Classification Search
CPC . B60Q 3/225; F21V 5/04; F21V 17/08; F21V 5/00; G02B 6/001; B60R 7/046; B60R 13/0243; B60R 13/02; F21W 2106/00; B60J 5/00

See application file for complete search history.

(56) References Cited

U.S. PATENT DOCUMENTS

| | | | |
|---|---|---|---|
| 2009/0073708 A1 | 3/2009 | Kino et al. | |
| 2011/0170304 A1 | 7/2011 | Fujita | |
| 2013/0058115 A1 | 3/2013 | Pfeil et al. | |
| 2013/0094233 A1 | 4/2013 | Ukai et al. | |
| 2014/0167445 A1 | 6/2014 | Uebelein et al. | |
| 2014/0226353 A1 | 8/2014 | Sohizad et al. | |
| 2015/0003093 A1 | 1/2015 | Omura et al. | |
| 2016/0236613 A1 | 8/2016 | Trier | |
| 2017/0174125 A1 | 6/2017 | Katsurayama et al. | |

FOREIGN PATENT DOCUMENTS

| | | |
|---|---|---|
| JP | 2009078794 | 4/2009 |
| JP | 2009-214600 | 9/2009 |
| JP | 2011-528636 | 11/2011 |
| JP | 2013100100 | 5/2013 |
| JP | 2014-129098 | 7/2014 |
| JP | 2014133459 | 7/2014 |
| JP | 2015039937 | 3/2015 |
| JP | 2015155298 | 8/2015 |
| JP | 2015216005 | 12/2015 |
| JP | 2016055668 | 4/2016 |
| JP | 2017095046 A | 6/2017 |
| WO | WO2016/027514 | 2/2016 |
| WO | WO2016/063797 | 4/2016 |

OTHER PUBLICATIONS

Extended European Search Report for corresponding Application No. EP 18 86 4096, dated Mar. 17, 2021—37 pages.

Japanese Office Action (w/ English translation) for corresponding JP Application No. 2021-131068, dated Sep. 27, 2022, 6 pages.

PCT International Search Report (w/ English translation) for corresponding PCT Application No. PCT/JP2018/036360, dated Dec. 11, 2018—5 pages.

Notice of Reasons for Refusal (with English translation) received in corresponding Application No. JP 2023-046879, dated Nov. 28, 2023, 6 pages.

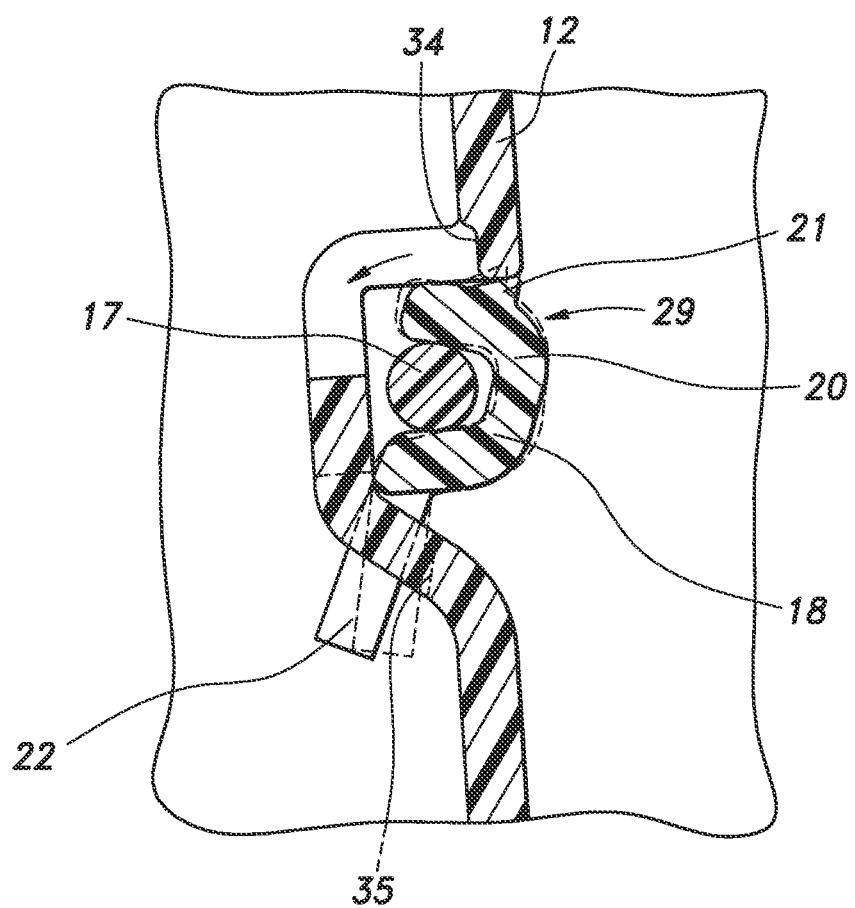

VEHICLE INTERIOR MEMBER

CROSS REFERENCE TO RELATED APPLICATIONS

This application is a continuation of U.S. patent application Ser. No. 17/399,256, filed on Aug. 11, 2021, which is a continuation of U.S. patent application Ser. No. 16/652,184, filed on Mar. 30, 2020, which is the U.S. national stage entry of International Application No. PCT/JP2018/036360, filed on Sep. 28, 2018, which claims priority to Japanese Patent Application No. 2017-192976, filed on Oct. 2, 2017, all of which are hereby incorporated herein by reference in their entireties for all purposes.

TECHNICAL FIELD

The present invention relates to a vehicle interior member configured to be fitted on a vehicle.

BACKGROUND ART

A known door lining fitted on a vehicle door is provided with a linear light guide member for transmitting light from a light source, and a lens provided along the light guide member, and these components are positioned between a door lining main body and a switch panel. (see Patent Document 1, for example) The lens is provided with a groove that retains the light guide member, a clamped portion that is clamped between the door lining main body and the switch panel, and engagement claws that are engaged by through holes provided in the door lining main body. The light guide member is connected to the door lining main body via the lens. A part of the light emitted from the light source is irradiated from a side surface of the light guide member, and reaches the cabin after passing through the clamped portion of the lens.

PRIOR ART DOCUMENT(S)

Patent Document(s)

Patent Document 1: JP2015-155298A

SUMMARY OF THE INVENTION

Task to be Accomplished by the Invention

According to the prior art disclosed in Patent Document 1, since the lens is clamped between the door lining main body and the switch panel, at the time of assembly, it is necessary to properly position the lens with respect to the door lining main body and the switch panel when clamping the lens between the door lining main body and the switch panel. Therefore, the assembly work is not simple.

In view of such a problem of the prior art, a primary object of the present invention is to provide a structure for a vehicle interior member having an interior member main body, a light guide member for conducting light from a light source, and a lens extending along the light guide member that allows the light guide member to be easily connected to the interior member main body.

To achieve such an object, the present invention provides an interior member (1) for a vehicle, comprising: an interior member main body (10, 11, 12) forming an inner wall of a cabin; a linear light guide member (17) configured to conduct light from a light source in a lengthwise direction and to irradiate the light from a side surface thereof; and a lens (18) that transmits the light irradiated from the light guide member; wherein the lens extends along the light guide member, and is provided with a groove (26) receiving the light guide member therein, a first engaging portion (21) provided on a wall that defines the groove, and a second engaging portion (22) provided on a wall that defines the groove, and the interior member main body is provided with a first engaged portion (34) engaged by the first engaging portion, and a second engaged portion (35) engaged by the second engaging portion, the lens being resiliently deformable so as to bring the walls defining the groove toward each other.

Since the relative position of the first engaging portion and the second engaging portion can be changed by resiliently deforming the lens so as to bring the walls defining the groove come toward each other, the first engaging portion and the second engaging portion can be brought into engagement with the first engaged portion and the second engaged portion, respectively, with ease. Owing to this engagement, the interior member main body and the lens can be joined to each other so that the lens and the light guide member can be mounted to the interior member main body with ease.

Preferably, the lens includes a first wall (23) extending along the light guide member, and a second wall (24) and a third wall (25) extending from either side edge of the first wall toward the light guide member, the groove being defined by the first wall, the second wall and the third wall.

Thereby, the lens can be resiliently deformed so as to cause the second wall and the third wall to come toward each other with ease, and a groove can be thereby formed in the lens.

Preferably, the interior member main body is provided with an interior member recess (29) receiving the light guide member and the lens therein, wherein the first engaging portion projects from a surface of the second wall facing away from the light guide member, and the first engaged portion comprises a hole formed in a wall part of the interior member main body defining the interior member recess so as to receive the first engaging portion therein, and wherein the second engaging portion projects from a surface of the third wall facing away from the light guide member, and the second engaged portion comprises a hole formed in a wall part of the interior member main body defining the interior member recess so as to receive the second engaging portion therein.

Since the lens is received in the interior member recess, the occupant is prevented from touching the lens so that damages to the lens can be avoided. Since the first engaging portion and the second engaging portion project in mutually opposing directions, and the lens and the interior member are joined to each other at the first engaging portion and the second engaging portion, the lens and the interior member can be firmly joined to each other.

Preferably, a projecting amount (L1) of the first engaging portion from the surface of the second wall is smaller than a projecting amount (L2) of the second engaging portion from the surface of the third wall.

The deformation of the lens that is required in the assembling process can be minimized by engaging the second engaging portion with the second engaged portion, and then engaging the first engaging portion with the first engaged portion so that the process of joining the lens to the interior member main body is facilitated.

Preferably, the second engaged portion is passed through the wall part defining the interior member recess, and the second engaging portion is passed through the second engaged portion.

Since the second engaging portion is engaged by the second engaged portion by being passed through the second engaged portion, the connection between the lens and the interior member main body can be made highly firm.

Preferably, the second engaging portion is formed in a free end edge of the third wall.

Thereby, the opening region of the groove can be reinforced by the second engaging portion.

Preferably, the first engaging portion includes a plurality of first engaging portions arranged in the extending direction of the lens, and the second engaging portion includes a plurality of second engaging portions arranged in the extending direction of the lens, the second engaging portions being each interposed between a corresponding mutually adjoining pair of the first engaging portions.

Since the first engaging portions and the second engaging portions can be engaged by the corresponding first engaging portions and the corresponding second engaging portions one after the other in an alternating manner, the lens can be attached to the interior member main body with ease. Since the first engaging portions and the second engaging portions are provided in mutually different positions along the extending direction of the lens, the attachment strength between the lens and the interior member main body can be maximized.

Preferably, the interior member main body includes a plate like main board (10) provided on a door panel (3) of a vehicle door (2), and a pocket member (11, 12) disposed on an inner side of the main board and defining a door pocket (6) in cooperation with the main body, and the light guide member and the lens are provided on at least one of the main board and the pocket member.

Thereby, the interior of the door pocket can be illuminated.

Preferably, the door pocket extends in a fore and aft direction on the vehicle door, and the interior member recess is formed in a wall surface of at least one of the main board and the pocket member on an inside of the door pocket, the interior member recess extending linearly along an extending direction of the door pocket.

The door pocket can be illuminated along the extending direction of the door pocket. Since the light guide member is formed as a linear member, the light guide member can be connected to the interior member main body without bending so that the assembly work is facilitated, and the light guide member is protected from being damaged.

Preferably, the interior member recess is defined by an upper wall (30), a side wall (31) and a lower wall (32), the lower wall inclining downward toward an inner part of the door pocket.

The light from the lens can illuminate a lower part of the door pocket so that the visibility of the storage space in the door pocket can be improved.

Preferably, the upper wall defining the interior member recess is disposed substantially horizontally.

Thereby, the light irradiated upward from the lens is shielded by the upper wall so that the visibility of the storage space in the door pocket can be improved.

Effect of the Invention

The present invention thus provides a structure for a vehicle interior member having an interior member main body, a light guide member for conducting light from a light source, and a lens extending along the light guide member that allows the light guide member to be easily connected to the interior member main body.

Owing to the structure wherein the lens includes a first wall extending along the light guide member, and a second wall and a third wall extending from either side edge of the first wall toward the light guide member, the groove being defined by the first wall, the second wall and the third wall, the lens can be resiliently deformed so as to cause the second wall and the third wall to come toward each other with ease, and a groove can be thereby formed in the lens.

In the arrangement where the lens is received in the interior member recess, and the first engaging portion and the second engaging portion project in mutually opposing directions, the occupant is prevented from touching the lens so that damages to the lens can be avoided, and the lens and the interior member can be firmly joined to each other.

If a projecting amount of the first engaging portion from the surface of the second wall is smaller than a projecting amount of the second engaging portion from the surface of the third wall, the lens can be joined to the interior member main body with ease by engaging the second engaging portion with the second engaged portion, and then engaging the first engaging portion with the first engaged portion. At this time, the deformation of the lens that is required in the assembling process can be minimized, and the process of assembling the lens to the interior member main body can be facilitated If the second engaged portion is passed through the wall part defining the interior member recess, and the second engaging portion is passed through the second engaged portion, the strength of the connection between the lens and the interior member main body can be further improved.

If the second engaging portion is formed in a free end edge of the third wall, the opening region of the groove can be reinforced by the second engaging portion.

According to the arrangement where the first engaging portion includes a plurality of first engaging portions arranged in the extending direction of the lens, and the second engaging portion includes a plurality of second engaging portions arranged in the extending direction of the lens, the second engaging portions being each interposed between a corresponding mutually adjoining pair of the first engaging portions, the lens can be easily and firmly attached to the interior member main body along the extending direction of the lens.

If the interior member main body includes a plate like main board provided on a door panel of a vehicle door, and a pocket member disposed on an inner side of the main board and defining a door pocket in cooperation with the main body, and the light guide member and the lens are provided on at least one of the main board and the pocket member, the interior of the door pocket can be illuminated.

If the door pocket extends in a fore and aft direction on the vehicle door, and the interior member recess is formed in a wall surface of at least one of the main board and the pocket member on an inside of the door pocket, the interior member recess extending linearly along an extending direction of the door pocket, the door pocket can be illuminated along the extending direction of the door pocket. In particular, since the light guide member can be connected to the interior member main body without bending, the assembling process is facilitated, and the light guide member is protected from damages.

If the interior member recess is defined by an upper wall, a side wall and a lower wall, the lower wall inclining downward toward an inner part of the door pocket, the light from the lens can illuminate a lower part of the door pocket so that the visibility of the storage space in the door pocket can be improved.

If the upper wall defining the interior member recess is disposed substantially horizontally, the light irradiated upward from the lens is shielded by the upper wall so that the visibility of the storage space in the door pocket can be improved.

BRIEF DESCRIPTION OF THE DRAWING(S)

FIG. 9 is a sectional view showing the lens before deformation (broken line) and after deformation (solid line) when assembling the lens into a recess of the inner board;

DESCRIPTION OF THE PREFERRED EMBODIMENT(S)

A vehicle interior member according to an embodiment of the present invention as applied to a door trim of a vehicle door on a right front seat of a vehicle is described in the following with reference to the drawings.

Figure 1:
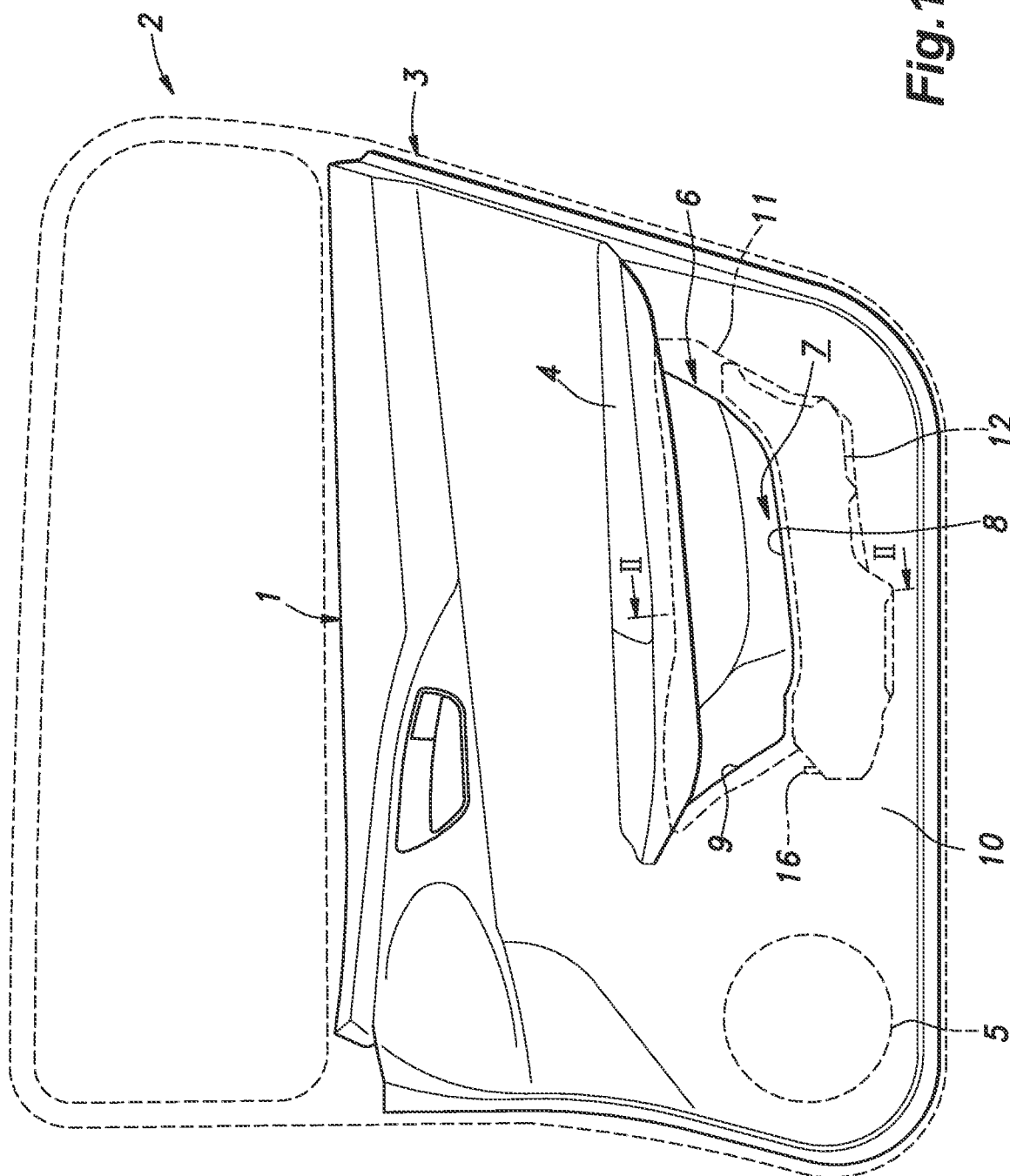
FIG. 1 is a side view showing a vehicle interior member (door trim) according to an embodiment of the present invention.

As shown in FIG. 1, a door trim 1 (interior member of a vehicle) covers an inboard surface of a door panel 3 which is a structural member of the door 2, and forms an inner wall of a cabin. The door panel 3 has an inner panel and an outer panel formed from sheet steel. The outer panel defines the outer surface of the vehicle body, and the inner panel is disposed on the inboard side of the outer panel, and is connected to the outer panel.

The door trim 1 is formed in a plate shape by a plurality of members each made of plastic material, and is arranged so that a major plane of the door trim 1 faces laterally on the inboard side of the door panel 3 or, more specifically, on the inboard side of the inner panel.

A substantially vertically middle part of the door trim 1 is formed with an armrest 4 that bugles in the inboard direction. The armrest 4 extends in the fore and aft direction from a middle part of the door trim 1 to the rear edge thereof. The upper surface of the armrest 4 is provided with a switch for controlling a window regulator and a lighting fixture of the cabin.

A speaker grill 5 is provided in a lower front part of the door trim 1. A door pocket 6 extends in the fore and aft direction behind the speaker grill 5 and under the armrest 4. The door pocket 6 is provided with a pocket recess 8 that has an open upper end, and defines a storage space 7 therein.

The door trim 1 includes a plate shaped main board 10 serving as a base member. The peripheral portion of the main board 10 extends toward the inner panel, and is connected to the inner panel. A gap is formed between the inner panel and the main board 10.

Figure 2:
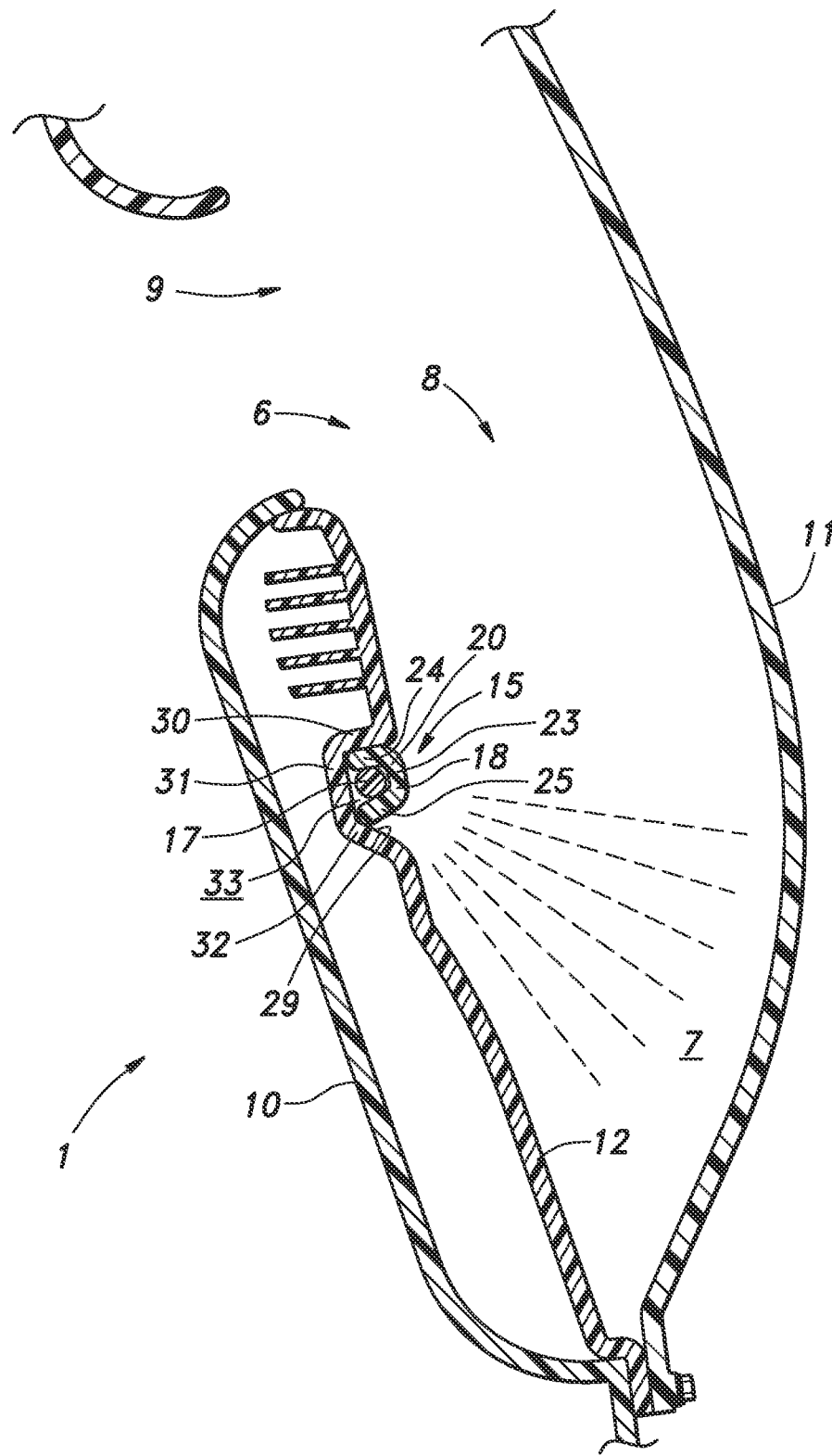
FIG. 2 is a sectional view taken along line II-II of FIG. 1.

As shown in FIGS. 1 and 2, the main board 10 has a through hole 9 passed laterally therethrough at a position corresponding to the door pocket 6. The door trim 1 is provided with an outer board 11 connected to an outboard surface of the main board so as to cover the through hole 9 from the outboard side, and an inner board 12 interposed between the main board 10 and the outer board 11 and connected to the outboard side of the main board 10. The main board 10, the outer board 11, and the inner board 12 jointly form the main body (interior member main body) of the door trim 1.

Figure 3:
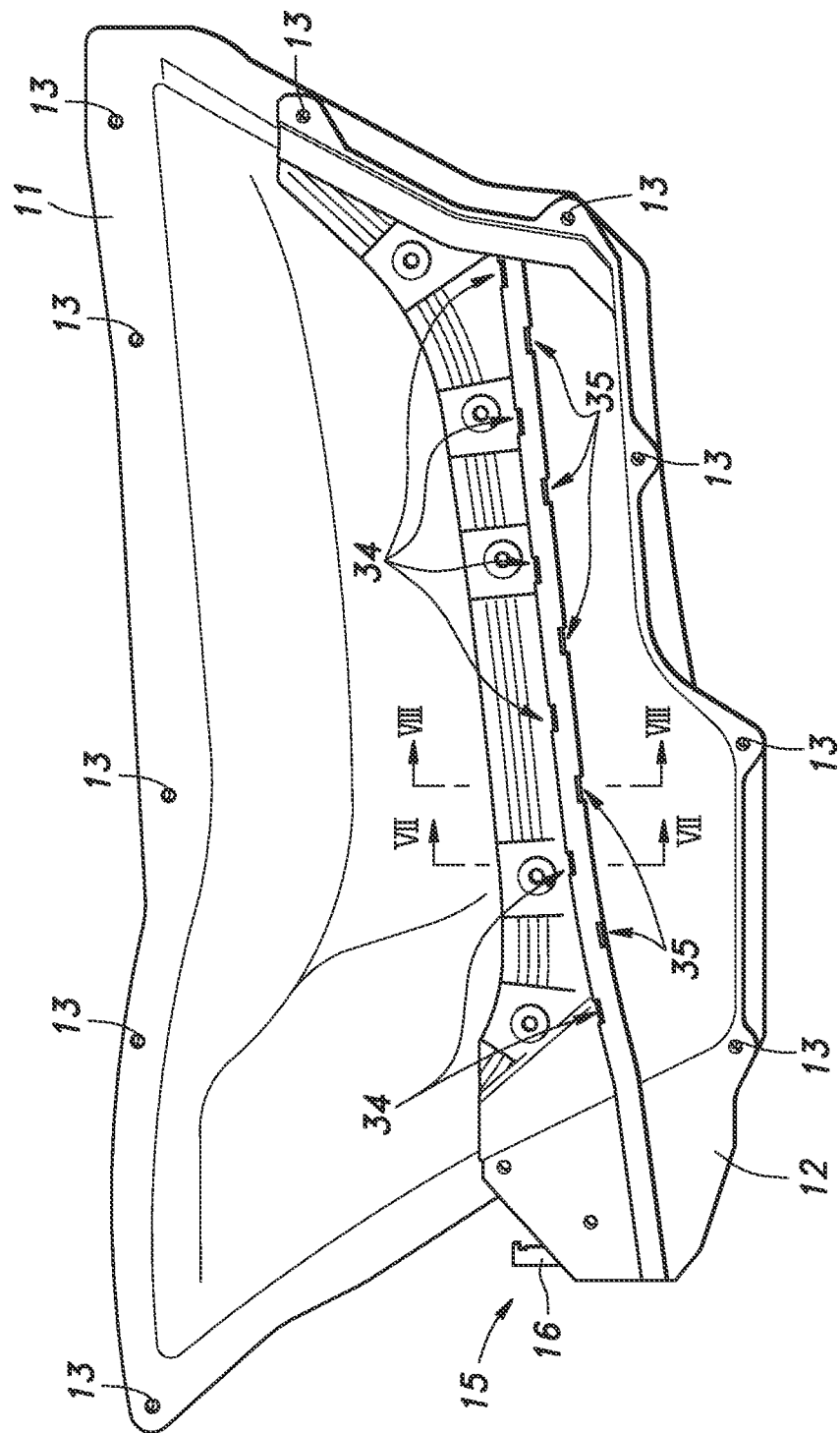
FIG. 3 is a side view of an outer board and an inner board as viewed from the inside of the vehicle.

As shown in FIGS. 1 and 3, the inner board 12 is formed in a plate shape, and extends in the fore and aft direction along the lower edge of the through hole 9 of the main board 10 on the outboard side of the main board 10. The inner board 12 is thus positioned along the lower edge of the through hole 9. The outer board 11 is formed in a plate shape, and generally corresponds to the through hole 9 of the main board 10 and the inner board 12 in shape. As shown in FIG. 2, the outer board 11 protrudes in the inboard direction at the peripheral part thereof, and is recessed in the outboard direction at the center. Screw holes 13 are formed in the peripheral part of the outer board 11, and the front edge part, the lower edge part, and the rear edge of the inner board 12 so that the inner board 12 and the outer board 11 are jointly fastened to the main board 10. The door pocket 6 is thus formed by fastening the inner board 12 and the outer board 11 to the main board 10. Therefore, the inner board 12 and the outer board 11 function as a pocket member forming a door pocket in cooperation with the main board 10. The inner board 12 forms the inboard wall of the storage space 7, and the outer board 11 forms the outboard wall of the storage space 7.

As shown in FIG. 1, the front edge of the inner board 12 extends forward from the gap between the main board 10 and the outer board 11 beyond the front edge of the outer board 11. The front edge of the inner board 12 is located between the inner panel and the main board 10.

Figure 4:
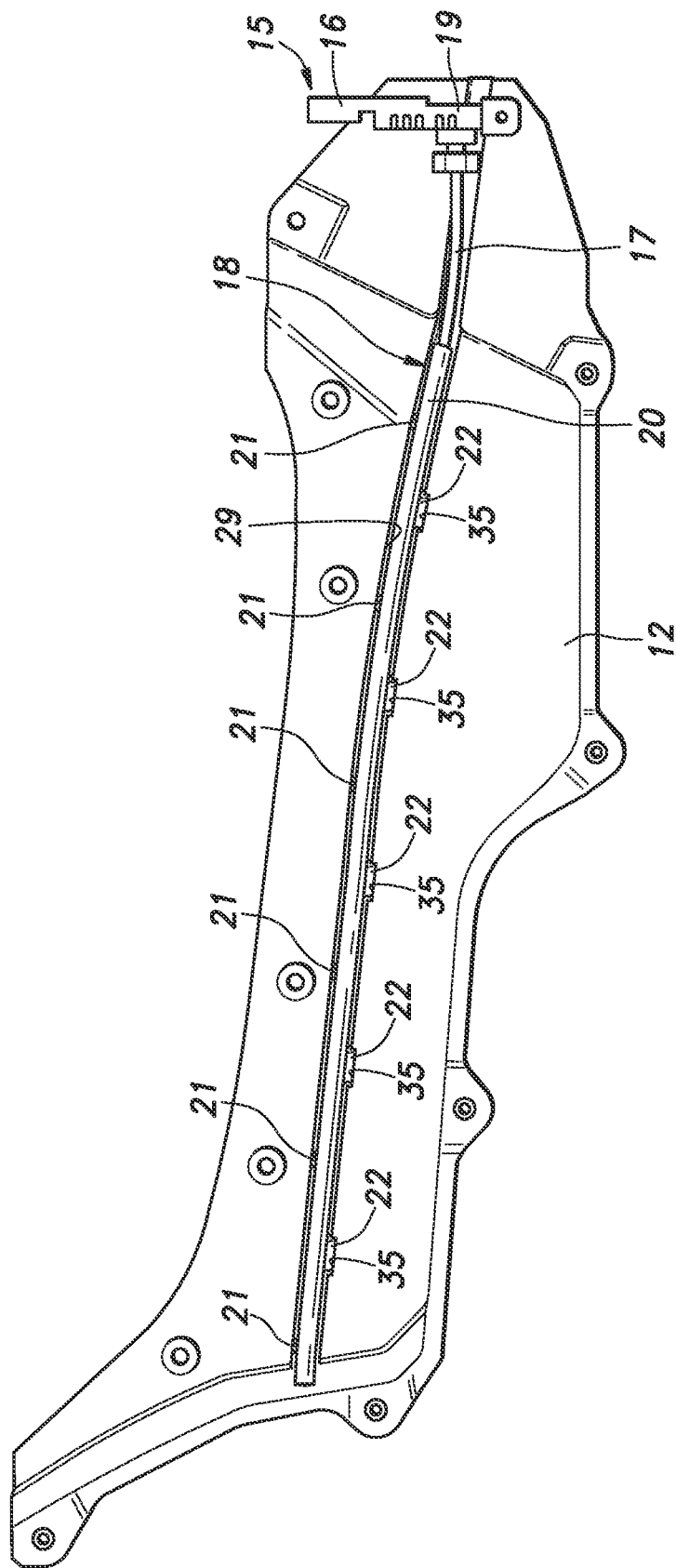
FIG. 4 is a side view of the inner board as viewed from the outside of the vehicle.
Figure 5:
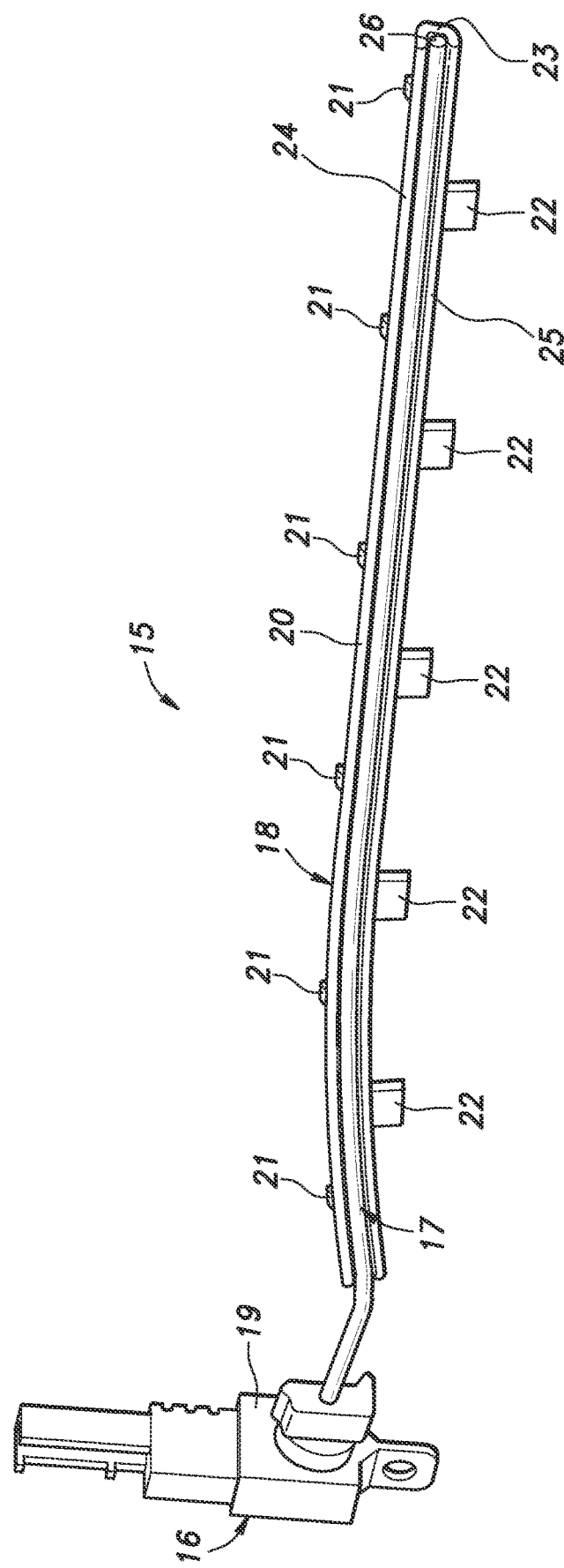
FIG. 5 is a perspective view of a light source, a light guide member, and a lens.

As shown in FIGS. 3 and 4, the inner board 12 is provided with a lighting device 15. As shown in FIG. 5, the lighting device 15 includes a light emitting member 16 including a light source, a light guide member 17, and a lens 18 connecting the light guide member 17 to the inner board 12.

The light emitting member 16 includes a circuit board (not shown) provided with an LED device, a lens (not shown) for concentrating the light emitted from the LED device at a predetermined position, and a holder 19 for accommodating the circuit board and the lens therein. As shown in FIGS. 1 and 4, the light emitting member 16 is fastened to the outboard surface of a front part of the inner board 12. The light emitting member 16 is electrically connected to a prescribed power supply (not shown) mounted on the vehicle body. The LED device functions as a light source, and is controlled by the switch provided on the armrest 4. A prescribed bolt hole is provided in the holder 19, and the light emitting member 16 is fastened to the inner board 12.

The light guide member 17 is formed of a highly transparent resin. The light guide member 17 is formed in a linear shape (wire shape), and has a circular cross section taken along a plane perpendicular to the longitudinal direction, or in cross section. As shown in FIG. 4, the light guide member 17 extends rearward from the light emitting member 16 along the inner board 12, and reaches the rear end of the inner board 12. One end of the light guide member 17 is coupled to the light emitting member 16. Light emitted from the LED device is collected by the lens of the light emitting member 16 and is incident to an end of the light guide member 17 coupled to the light emitting member 16. The light guide member 17 transmits the incident light along the lengthwise direction, and emits the incident light from the outer peripheral side surface thereof. The light guide member 17 may consist of an optical fiber cable configured to emit light from the side surface thereof by having a core member mixed with a material that diffuses the transmitted light, or a core member with an irregular circumferential surface that diffuses the transmitted light.

Figure 6:
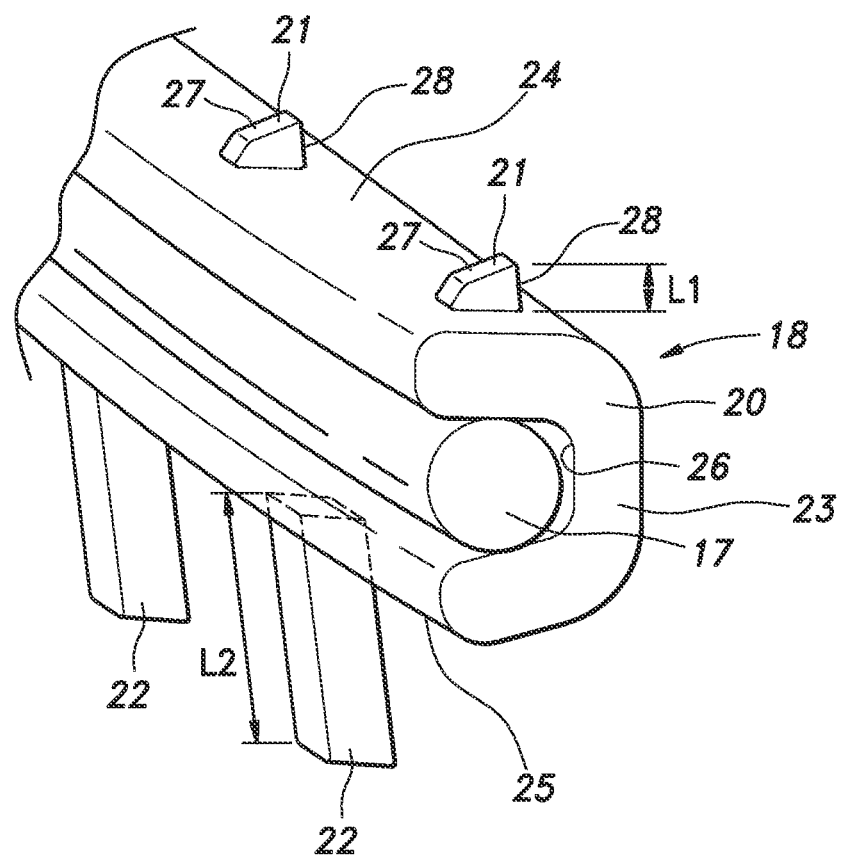
FIG. 6 is a perspective view of a lighting device.

The lens 18 is formed of a highly transparent resin that transmits light emitted from the light guide member 17. As shown in FIGS. 5 and 6, the lens 18 includes a lens main body 20 extending along the lengthwise direction of the light guide member 17, a plurality of engagement claws 21 (first engagement portions) protruding from the outer surface of the lens main body 20, and a plurality of engagement projections 22 (second engagement portions) protruding from the outer surface of the lens main body 20.

As shown in FIGS. 2 and 6, the lens main body 20 includes a first wall 23 provided along the light guide member 17, and a second wall 24 and a third wall 25 protruding from either side end of the first wall 23 toward the light guide member 17. The first wall 23, the second wall 24, and the third wall 25 jointly form a groove 26 in the lens main body 20 so as to be recessed in a direction perpendicular to the extending direction thereof. The lens main body 20 thus has a substantially U-shaped cross section with an open side facing in the inboard direction. The light guide member 17 is received in the groove 26. The light guide member 17 is located between the second wall 24 and the third wall 25. The first wall 23, the second wall 24, and the third wall 25 each extend along the extending direction of the light guide member 17, and the groove 26 is formed so as to extend along the extending direction of the lens main body 20.

In the present embodiment, the diameter of the light guide member 17 is slightly larger than the distance between the second wall 24 and the third wall 25, and the light guide member 17 is press-fitted into the groove 26. The light guide member 17 is thus held between the second wall 24 and the third wall 25, and connected to the lens main body 20. The light emitted from the side surface of the light guide member 17 passes through the lens main body 20 and is emitted from the outer surface of the lens 18.

The engagement claws 21 protrude from the surface of the second wall 24 facing away from the light guide member 17 (hereinafter, referred to as the outer surface of the second wall 24), or, in other words, from the upper surface of the second wall 24, and are arranged along the extending direction of the lens main body 20 substantially at regular intervals. Each engagement claw 21 is provided with an inclined surface 27 which is inclined so as to come close to the light guide member 17 toward the opening direction of the groove 26, and an engagement surface 28 which is formed at an end of the inclined surface 27 remote from the opening of the groove 26 and substantially perpendicular to the outer surface of the second wall 24, and is thus claw-shaped. In the present embodiment, the lens 18 is provided with six engagement claws 21.

The engagement projections 22 project from a surface of the third wall 25 facing away from the light guide member 17 (hereinafter, referred to as an outer surface of the third wall 25), or, in other words, the lower surface of the third wall 25 and are arranged at substantially equal intervals in the extending direction of the lens main body 20. The engagement projections 22 protrude in a direction opposite to the direction in which the engagement claws 21 protrude in a cross-sectional view of the lens main body 20. Each engagement projection 22 is plate shaped, and has a major plane parallel to the extending direction of the lens main body 20. The engagement projections 22 are each formed at a substantially central position between two mutually adjoining engagement claws 21 with respect to the extending direction of the lens main body 20. Therefore, the engagement claws 21 and the engagement projections 22 alternately protrude upward and downward, respectively, along the extending direction of the lens main body 20, and are thus arranged in a staggered manner. In the present embodiment, the lens 18 is provided with five engagement projections 22.

As shown in FIG. 6, the amount of protrusion of each engagement claw 21 from the outer surface of the second wall 24 (L1 in FIG. 6) is selected to be smaller than the amount of protrusion of each engagement projection 22 from the outer surface of the third wall 25 (L2 in FIG. 6).

Figure 8:
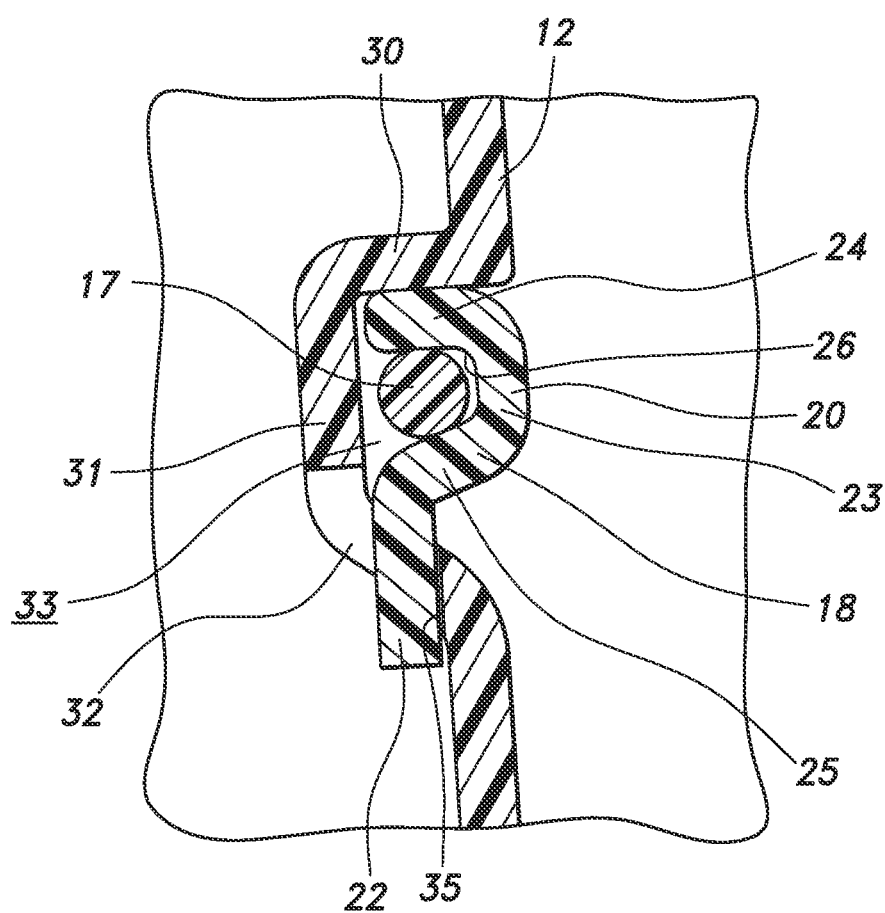
FIG. 8 is a sectional view taken along line VIII-VIII of FIG. 3.

As shown in FIG. 8, in the present embodiment, each engagement projection 22 is provided on the free end of the outer surface of the third wall 25, or, in other words, at the end of the third wall 25 on side of the groove 26. Thereby, the opening edge of the groove 26 is reinforced, and damage to the lens 18 can be prevented.

Under a loading that causes the second wall 24 and the third wall 25 to move toward each other, the lens main body 20 is elastically deformed so that the second wall 24 and the third wall 25 approach each other. FIG. 9 shows the lens 18 before deformation in a broken line, and the lens 18 after deformation in a solid line. When a downward load is applied to the second wall 24 and an upward load is applied to the third wall 25, the lens main body 20 is deformed so that the distance between the second wall 24 and the third wall 25 is reduced.

Figure 7:
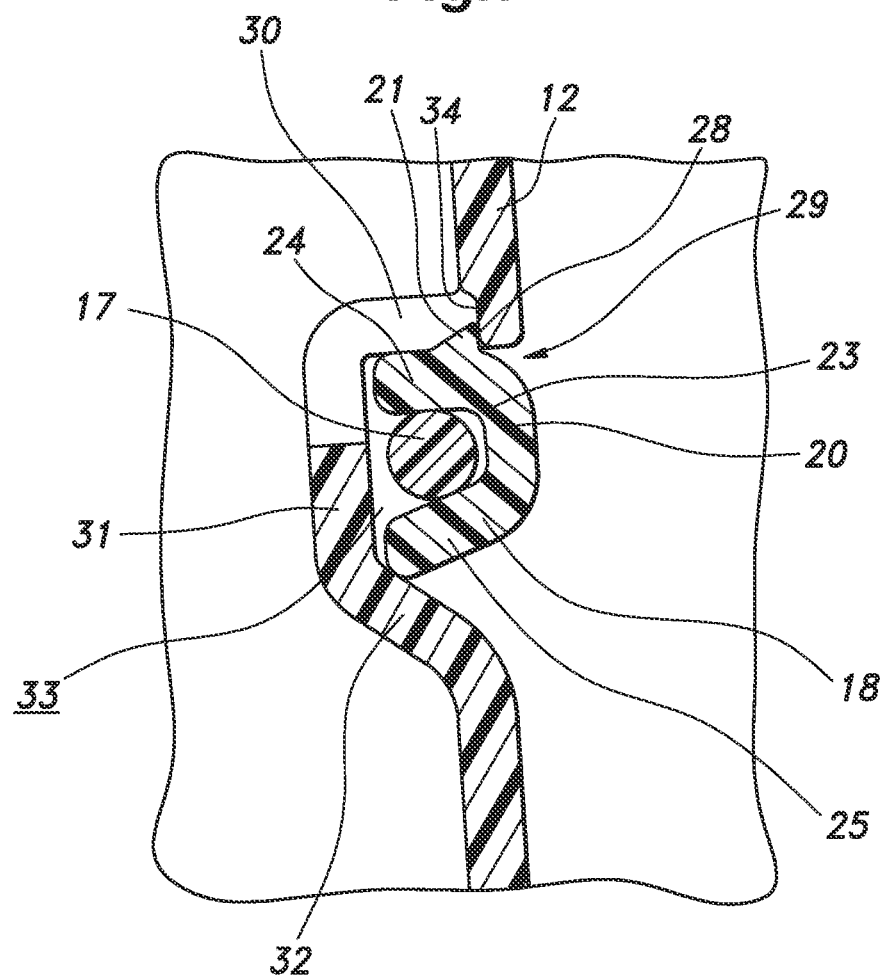
FIG. 7 is a sectional view taken along line VII-VII of FIG. 3.

As shown in FIGS. 2 and 7, the inner board 12 is formed with a board recess 29 (interior member recess) that is recessed in the outboard direction. As shown in FIG. 4, the board recess 29 extends substantially linearly rearward from the position where the light emitting member 16 is attached to the inner board 12. The board recess 29 receives the lens 18 and the light guide member 17 therein.

The light guide member 17 extends from the light emitting member 16 along the board recess 29, between the outer board 11 and the inner board 12, and reaches the interior of the pocket recess 8. The lens 18 extends in the fore and aft direction along the light guide member 17 inside the pocket recess 8. The light emitted from the LED device reaches the pocket recess 8 via the light guide member 17. As shown in FIG. 2, inside the pocket recess 8, the light emitted from the side surface of the light guide member 17 reaches the storage space 7 through the lens 18, and illuminates the storage space 7. Therefore, the occupant can easily visually recognize the stored items inside the storage space 7. In the present embodiment, the lens 18 is provided so as to extend only along the part of the light guide member 17 located inside the pocket recess 8, but, alternatively, the lens 18 may extend additionally along the part of the light guide member 17 extending from the light emitting member 16 to the pocket recess 8.

As shown in FIG. 1, a door pocket 6 is formed in the door trim 1 so as to extend in the fore and aft direction. As shown in FIG. 4, the board recess 29 also extends substantially in the fore and aft direction so as to correspond with the door pocket 6. The light guide member 17 also extends along the direction in which the door pocket 6 extends. Therefore, the storage space 7 is illuminated over the entire fore and aft length thereof. In addition, since the board recess 29 extends substantially linearly, the light guide member 17 can be received in the board recess 29 without being bent so that the damage to the light guide member 17 that could be caused by bending can be avoided.

As shown in FIGS. 7 and 8, the upper surface of the board recess 29 is defined by an upper wall 30, the inboard surface by an inboard wall 31, and the lower surface by a lower wall 32. The upper wall 30 and the lower wall 32 face each other. The lens 18 is arranged such that the outer surface of the second wall 24 thereof faces upward, the outer surface of the third wall 25 thereof faces downward, and the first wall 23 thereof closes the opening of the board recess 29 while spaced from the inboard wall 31. The first wall 23, the second wall 24, the third wall 25, and the inboard wall 31 jointly define a receiving chamber 33 that receives the light guide member 17. The light guide member 17 is surrounded by the first wall 23, the second wall 24, the third wall 25, and the inboard wall 31 in the receiving chamber 33 so that the movement of the light guide member 17 in the vertical and lateral directions is restricted.

The upward movement of the lens main body 20 is restricted by the upper wall 30, and the downward movement of the lens main body 20 is restricted by the lower wall 32. Preferably, the mutually opposing wall surfaces of the upper wall 30 and the lower wall 32 respectively contact the second wall 24 and the third wall 25, respectively, when the lens main body 20 is received in the board recess 29. Since the second wall 24 abuts on the upper wall 30 and the third wall 25 abuts on the lower wall 32, the lens 18 is prevented from being dislodged from the board recess 29.

A first receiving hole 34 (first engaged portion) is passed vertically through the part of the upper wall 30 corresponding to each engagement claw 21. A second receiving hole 35 (second engaged portion) is passed vertically through the part of the lower wall 32 corresponding to each engagement projection 22. In the present embodiment, six first receiving holes 34 and five second receiving holes 35 are formed in the inner board 12.

As shown in FIG. 7, each engagement claw 21 is fitted in the corresponding first receiving hole 34. Once the engagement claw 21 is received in the first receiving hole 34, the engagement surface 28 of the engagement claw 21 contacts a wall surface defining the first receiving hole 34 so that the movement of the upper part of the lens 18 in the lateral direction is restricted.

As shown in FIG. 8, each engagement projection 22 is fitted in the corresponding second receiving hole 35. Owing to the engagement between the engagement projection 22 and the second receiving hole 35, the lower part of the lens 18 is restricted from moving in the lateral direction. Since the engagement projection 22 is passed through the second receiving hole 35, the movement of the lower part of the lens 18 in the lateral direction is restricted in a highly reliable manner.

In the present embodiment, as shown in FIG. 7, each first receiving hole 34 extends through the upper wall 30 and an upper part of the inboard wall 31. As shown in FIG. 8, each second receiving hole 35 extends through the lower wall 32 and a lower part of the inboard wall 31. Therefore, the corresponding engagement claw 21 and the engagement projection 22 can be easily fitted into the first receiving hole 34 and the second receiving hole 35, respectively.

As shown in FIGS. 2, 7, and 8, the vertical movement of the lens main body is restricted by the upper wall 30 and the lower wall 32. Owing to these restrictions, the lens 18 is connected to the inner board 12, and the light guide member 17 is connected to the inner board 12 via the lens 18.

The width of each second receiving hole 35 in the extending direction of the board recess 29 is substantially equal to or slightly greater than the width of the engagement projection 22 in the extending direction of the lens main body 20. Since the front wall and the rear wall defining the second receiving hole 35 restrict the movement of the engagement projection 22 in the fore and aft direction, the movement of the lens 18 in the extending direction of the board recess 29 is restricted. Thereby, the lens 18 can be firmly connected to the inner board 12.

As shown in FIG. 2, the upper wall 30 has a major plane that extends substantially horizontally, or faces in the vertical direction. Therefore, the light emitted upward from the lens 18 is blocked by the upper wall 30. On the other hand, the lower wall 32 is inclined downward toward the inside of the pocket recess 8. Therefore, the light irradiated downward from the lens 18 reaches the storage space 7 without being blocked by the lower wall 32. Since the light emitted from the lens 18 does not directly reach the occupant's eyes, the occupant can easily see the inside of the storage space 7.

The process of assembling the lens 18 and the light guide member 17 to the inner board 12 is discussed in the following. After the light guide member 17 is pressed into the groove 26, the engagement projections 22 are inserted into the respective second receiving holes 35. Thereafter, as shown by an arrow in FIG. 9, the lens main body 20 is pushed into the board recess 29. At this time, the inclined surface 27 is pressed by the upper wall 30 so that a downward force is applied to the second wall 24. As the upward force is applied to the third wall 25 by the lower wall 32, the lens main body 20 is elastically deformed. The engagement claws 21 move toward the third wall 25 due to the elastic deformation of the lens main body 20. As a result, the lens 18 can be rotated about the lower end of the lens main body 20 in the direction to move the lens main body 20 into the board recess 29. At this time, by elastically deforming the lens main body 20 to such an extent that the distance between the second wall 24 and the third wall 25 becomes smaller by about the amount of protrusion of the engagement claws 21 before deformation, the lens main body 20 can be inserted into the board recess 29. Thus, since the amount of protrusion of the engagement claws 21 from the outer surface of the second wall 24 is smaller than that of the engagement projection 22, the amount of deformation of the lens main body 20 required for the assembly process can be reduced so that the assembly process is facilitated.

As the lens 18 is rotated, the engagement claws 21 are fitted into the respective first receiving holes 34, and the assembly process is completed. As described above, since the assembly process is completed simply by inserting the lens main body 20 into the board recess 29, the assembly process can be performed with ease. Since the inclined surface 27 is formed on each engagement projection 22, the lens main body 20 can be easily deformed so that the lens main body 20 can be easily inserted into the board recess 29.

The advantages of the door trim 1 are discussed in the following. After the light guide member 17 is pressed into the groove 26, the engagement projections 22 are inserted into the respective second receiving holes 35 in such a manner that the lens main body 20 is elastically deformed, and the engagement claws 21 are engaged by the respective first receiving holes 34. This completes the assembly of the light guide member 17 and the lens 18 to the inner board 12. Therefore, the assembly is simple. Further, by suitably selecting the arrangement of the first receiving holes 34 and the second receiving holes 35, the light guide member 17 and the lens 18 can be attached to desired positions of the inner board 12. Therefore, the degree of freedom of arrangement of the light guide member 17 and the lens 18 is improved.

The lens 18 is connected to the inner board 12 via the engagement claws 21 and the engagement projections 22 formed on the upper and lower surfaces of the lens main body 20, respectively. The engagement claws 21 and the engagement projections 22 project in mutually opposite directions. Since the lens main body 20 is connected to the inner board 12 at the upper part and the lower part thereof, the connection between the lens 18 and the inner board 12 is very firm. Therefore, even when the occupant touches the lens 18, the lens 18 is prevented from being dislodged from the inner board 12.

The lens 18 is received in the board recess 29, and does not protrude from the inner wall surface of the inner board 12 into the pocket recess 8. Therefore, the occupant's hand is prevented from touching the lens 18 so that the lens 18 is prevented from being dislodged from the inner board 12.

As shown in FIG. 2, the light guide member 17 is covered by the lens main body 20 from above and below and from the outboard direction, and is surrounded by the lens 18 and the outer wall surface of the inner board 12 in such a manner that the light guide member 17 is not exposed to the interior of the pocket recess 8. Therefore, the light guide member 17 is protected by the lens main body 20, and the light guide member 17 is protected from damages. Further, the light guide member 17 is prevented from becoming dirty so that stable illumination can be ensured.

The engagement projections 22 project from the outer surface of the third wall 25 in parallel with each other. Therefore, the engagement projections 22 can be easily fitted into the respective second receiving holes 35. Further, by providing the engagement claws 21 and the engagement projections 22 on the lens main body 20, the lens main body 20 is reinforced and the lens 18 is protected from damages.

Further, since the light guide member 17 is press fitted into and retained in the groove 26, no engagement features are required to be provided on the light guide member 17 so that the connecting structure between the light guide member 17 and the lens 18 can be simplified.

The engagement claws 21 and the engagement projections 22 alternately protrude along the extending direction of the lens 18. Therefore, as compared with the case where the engagement claws 21 and the engagement projections 22 project up and down, respectively, at the same positions in the extending direction of the lens main body 20, the assembling of the lens 18 is simplified because the engagement claws 21 and the engagement projections 22 can be engaged with the first receiving holes 34 and the second receiving holes 35, respectively, in a sequential manner from one end to the other. Further, since the lens 18 is coupled to the inner board 12 in the upper part and the lower part thereof in an alternating manner along the extending direction, the coupling between the lens 18 and the inner board 12 can be strengthened.

The present invention has been described in terms of a specific embodiment, but is not limited by such an embodiment, and can be modified in various ways without departing from the scope of the present invention. The first receiving holes 34 and the second receiving holes 35 were formed as through holes for receiving the engagement claws 21 and the engagement projections 22, respectively, in the foregoing embodiment, but may also be formed in any forms of recesses that are configured to receive and engage the engagement claws 21 and the engagement projections 22.

Figure 10A:
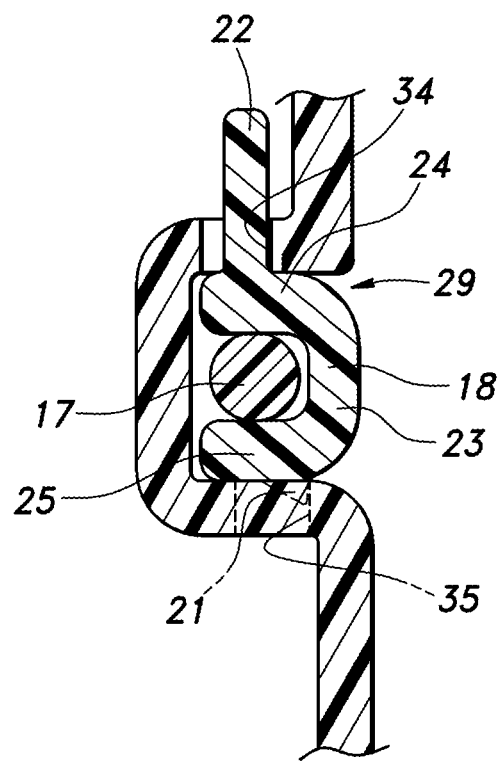
FIG. 10A is a sectional view showing a case where engagement projections are provided on an outer surface of a second wall, and engagement claws are provided on an outer surface of a third wall.
Figure 10B:
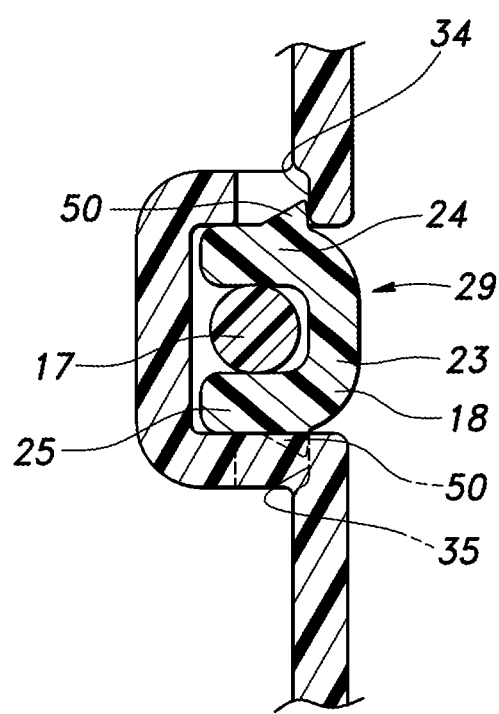
FIG. 10B is a sectional view of an alternate embodiment of the present invention where engagement claws are provided on an outer surface of each of a second wall and a third wall.

As shown in FIG. 10(A), the engagement projections 22 may be provided on the outer surface of the second wall 24 of the lens main body 20, and the engagement claw 21 may be provided on the outer surface of the third wall 25 of the lens main body 20. In this case, the engagement projections 22 are inserted into the respective first receiving holes 34, and the engagement claws 21 are engaged by the respective second receiving holes 35. As shown in FIG. 10(B), the engagement claws 50 may also be provided on both the outer surface of the second wall 24 and the outer surface of the third wall 25 of the lens main body 20, and are engaged by the first receiving holes 34 and the second receiving holes 35.

In the foregoing embodiment, the light guide member 17 was press fitted into the groove 26. However, it may be arranged such that the light guide member 17 is clamped between the second wall 24 and the third wall 25 of the lens main body 20 owing to the pressure which the second wall 24 and the third wall 25 of the lens main body 20 receives from the upper wall 30 and the lower wall 32 of the board recess 29 in the direction directed toward the light guide member 17 when the lens main body 20 is fitted into the board recess 29. Further, the optical fiber (the light guide member 17) may be prevented from being dislodged from the groove 26 by providing projections on the surfaces of the second wall 24 and the third wall 25 facing the light guide member 17.

In the foregoing embodiment, the light guide member 17 and the lens 18 were provided on the inner board 12, but may also be provided on the outer board 11. When a pocket board for forming the door pocket 6 is attached the main board 10 without forming the through hole 9, the light guide member 17 and the lens 18 may be provided either on the main board 10 or on the pocket board.

In the foregoing embodiment, the lighting device 15 illuminated the storage space 7 of the door pocket 6, but may also be provided on any other member forming a part of the cabin. For example, the lighting device 15 may be configured to illuminate a switch provided on the armrest, or the feet of the occupant when closing or opening the door. Further, in the foregoing embodiment, the present invention was applied to the door trim 1, but may also be applied to a member forming a center console or a dashboard.

GLOSSARY

1: door trim (vehicle interior member)
2: door
3: door panel
6: door pocket
10: main board
11: outer board (pocket member)
12: inner board (pocket member)
17: light guide member 18: lens
19: holder
21: engagement claw (first engaging portion)
22: engagement projection (second engaging portion)
23: first wall
24: second wall
25: third wall
26: groove
29: board recess (recess of interior member)
30: upper wall
31: inboard wall
32: lower wall
34: first receiving hole (first engaged portion)
35: second receiving hole (second engaged portion)

The invention claimed is:

1. An interior member for a vehicle, comprising:
an interior member main body forming an inner wall of a cabin;
a linear light guide member configured to conduct light from a light source in a lengthwise direction and to irradiate the light from a side surface thereof; and
a lens that transmits the light irradiated from the light guide member;
wherein the interior member main body is provided with an interior member recess receiving the light guide member and the lens, and
wherein the lens extends along the light guide member, and is provided with a groove receiving the light guide member therein, a first engaging portion provided on a wall that defines the groove, and a second engaging portion provided on a wall that defines the groove, and the interior member main body is provided with a first engaged portion engaged by the first engaging portion, and a second engaged portion engaged by the second engaging portion,
the first engaging portion includes a plurality of first engaging portions arranged in an extending direction of the lens,
the second engaging portion includes a plurality of second engaging portions arranged in the extending direction of the lens,
the second engaging portions are each interposed between a corresponding mutually adjoining pair of the first engaging portions, and
a surface of the light guide member in an opening direction of the interior member recess and a surface of the interior member main body located above the interior member recess are aligned.

2. The interior member for a vehicle according to claim 1, wherein the interior member main body is provided with a recess upper wall that defines an upper boundary of the interior member recess, a recess lower wall that defines a lower boundary of the recess, and a recess side wall that defines a side boundary of the recess,
the recess upper wall, the recess side wall, and the recess lower wall are formed by being integrally molded so that the recess lower wall and the recess upper wall are directly connected to the recess side wall respectively,
the first engaged portion is provided with the recess upper wall,
the second engaged portion is provided with the recess lower wall, and
the recess lower wall is inclined downward toward an opening direction of the interior member recess.

3. The interior member for a vehicle according to claim 1, wherein the lens includes a lens main body that has a U-shaped cross-section with an open side facing in the opposite of the opening direction of the interior member recess.

4. The interior member for a vehicle according to claim 3, wherein the lens includes a lens lower wall which defines a lower edge of the groove, and
the lens lower wall is inclined downward toward an opposite direction of the opening direction of the interior member recess.

5. The interior member for a vehicle according to claim 1, wherein the first engaged portion is a hole to receive the first engaging portion,
the second engaged portion is a hole to receive the second engaging portion, and
the first engaging portion protrudes from the surface of a lens upper wall facing away from the light guide member,
the first engaging portion is provided with an inclined surface which is inclined to come close to the light guide member toward the opening direction of the groove, and an engagement surface is formed at an end of the inclined surface remote from the opening of the groove and perpendicular to an outer surface of the lens upper wall.

6. The interior member for a vehicle according to claim 5, wherein the second engaging portion projects from the surface of the lens lower wall facing away from the light guide member,
the second engaged portion is the hole to go through the interior member main body, and
the second engaging portion passes through the second engaged portion.

7. The interior member for a vehicle according to claim 5, wherein the second engaging portion is each formed at a central position between two mutually adjoining the first engaging portions with respect to the extending direction of the lens.

8. The interior member for a vehicle according to claim 1, wherein the interior member main body includes a main board with a plate-like shape provided on a door panel of a vehicle door, and a pocket member disposed on an inner side of the main board and defining a door pocket in cooperation with the main board, and the light guide member and the lens are provided on at least one of the main board and the pocket member.

9. A method for manufacturing an interior member, the method comprising:
preparing an interior member main body forming an inner wall of a cabin provided with an interior member recess, a linear light guide member configured to conduct light from a light source in a lengthwise direction and to irradiate the light from a side surface thereof, and a lens that transmits the light irradiated from the light guide member, and
embedding the lens to the interior member recess;
wherein the interior member main body is provided with an interior member recess receiving the light guide member and the lens, and
wherein the lens includes a groove to receive the light member, a first engaging portion provided on a wall that defines the groove, and a second engaging portion provided on a wall that defines the groove,
the interior member main body is provided with a first engaged portion engaged by the first engaging portion, a second engaged portion engaged by the second engaging portion, the first engaging portion includes a plurality of first engaging portions arranged in an extending direction of the lens,
the second engaging portion includes a plurality of second engaging portions arranged in the extending direction of the lens,
the second engaging portions are each interposed between a corresponding mutually adjoining pair of the first engaging portions, and
a surface of the light guide member in an opening direction of the interior member recess and a surface of the interior member main body located above the interior member recess are aligned.

* * * * *